No. 664,686. Patented Dec. 25, 1900.
M. SMITH.
CULTIVATOR AND HARROW.
(Application filed Mar. 7, 1900.)
(No Model.) 2 Sheets—Sheet 1.
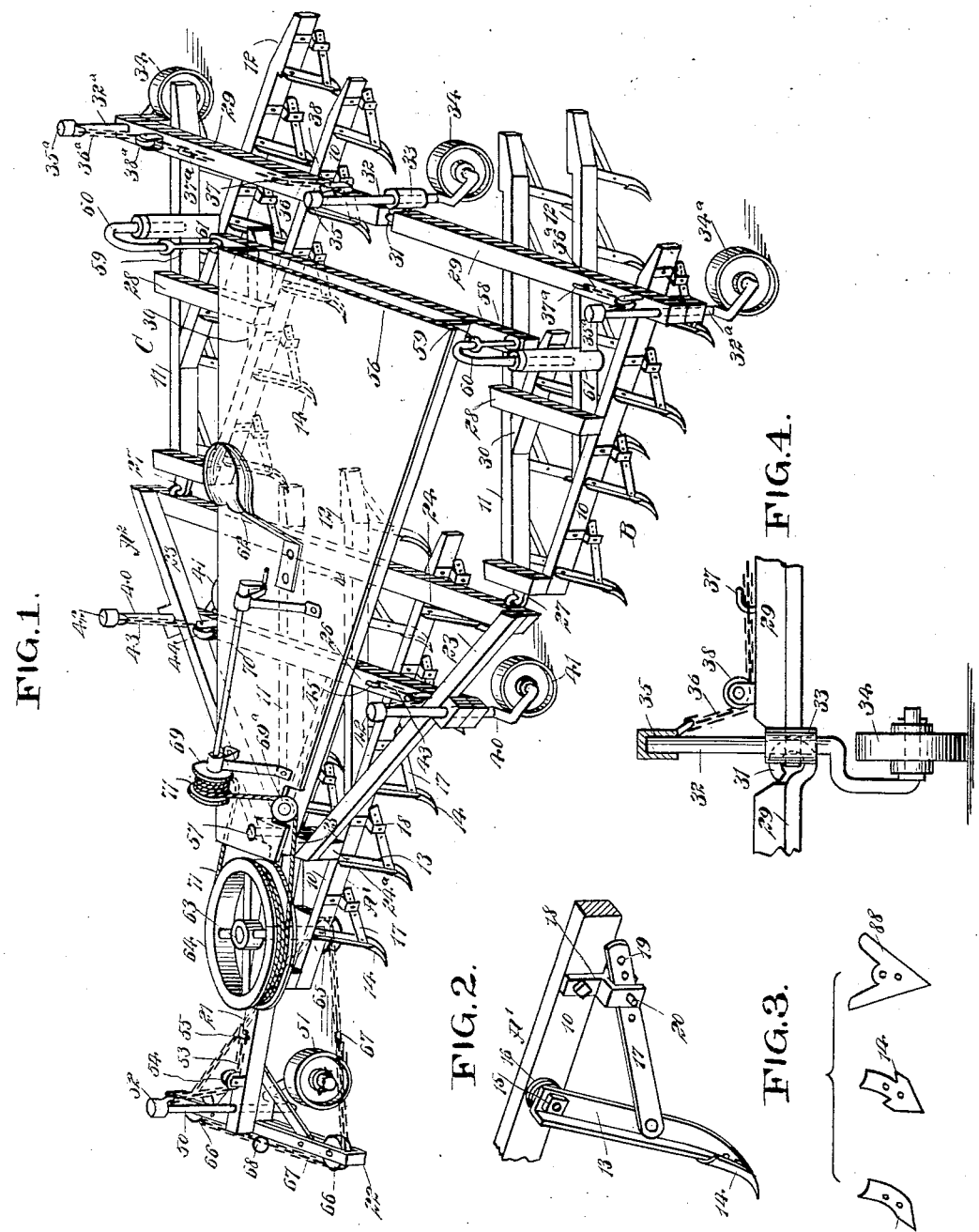
WITNESSES:
INVENTOR
Michael Smith
BY
ATTORNEYS No. 664,686. Patented Dec. 25, 1900.
M. SMITH.
CULTIVATOR AND HARROW.
(Application filed Mar. 7, 1900.)
(No Model.) 2 Sheets—Sheet 2.
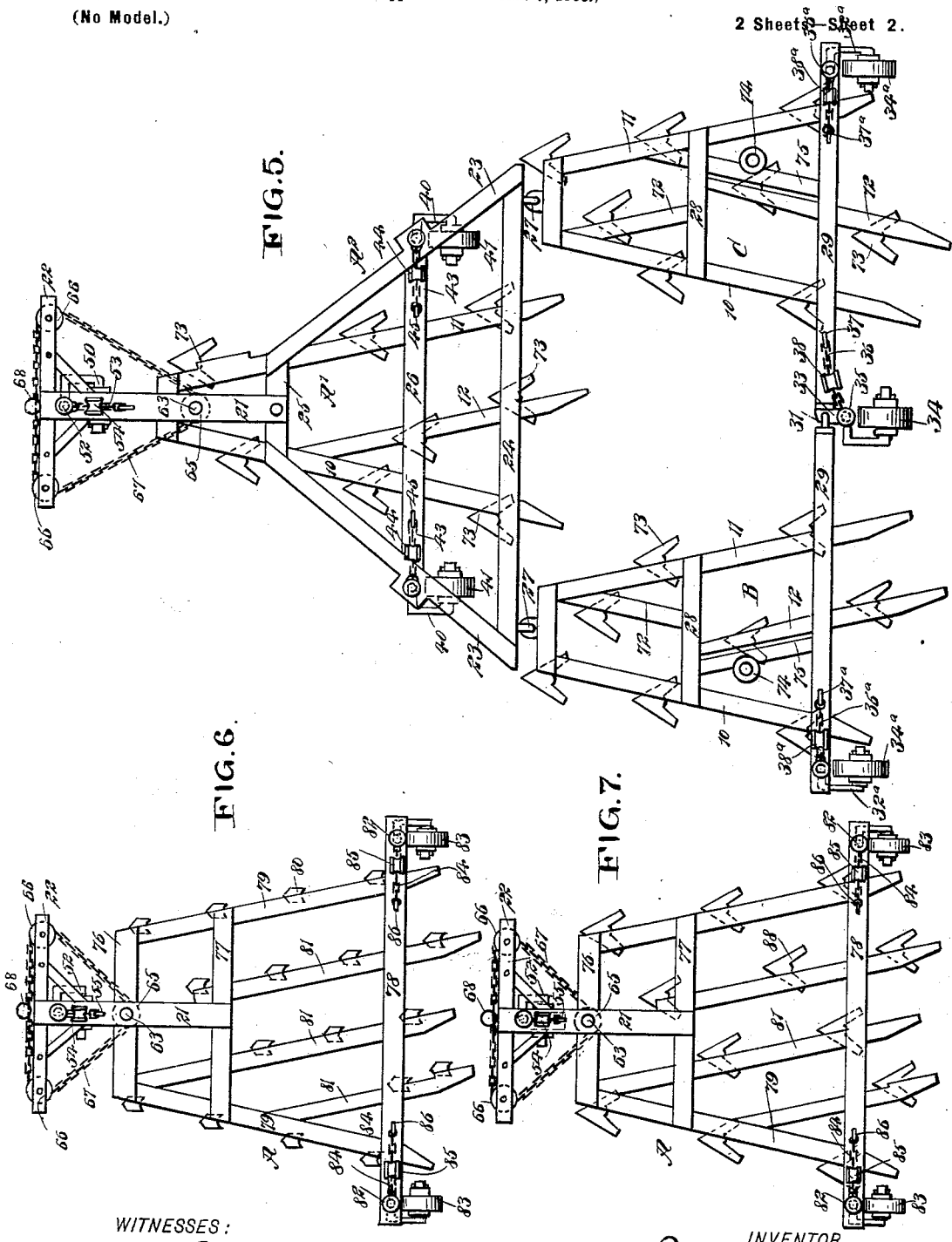
WITNESSES:
INVENTOR
Michael Smith
BY
ATTORNEYS

UNITED STATES PATENT OFFICE.

MICHAEL SMITH, OF ASOTIN, WASHINGTON.

CULTIVATOR AND HARROW.

SPECIFICATION forming part of Letters Patent No. 664,686, dated December 25, 1900.

Application filed March 7, 1900. Serial No. 7,668. (No model.)

*To all whom it may concern:*

Be it known that I, MICHAEL SMITH, a citizen of the United States, and a resident of Asotin, in the county of Asotin and State of Washington, have invented a new and Improved Cultivator and Harrow, of which the following is a full, clear, and exact description.

One object of my invention is to provide an agricultural machine that will act as a weed-exterminator, pulverizer, and cultivator.

A further object of the invention is to so construct the machine that a series of frames may be coupled together in a yielding manner, and, furthermore, to provide vertically-adjustable caster-wheels for the various frames and their connections, which wheels serve to regulate the depth that the shovels shall enter the ground.

Another object of the invention is to provide an arrangement of shovels upon the various sections that will effectually clear the ground of weeds wherever the shovels pass over said ground and to so couple the sections that the weeds will be left upon the surface of the ground.

A further object of the invention is to provide a simple means for quickly shifting the draft to the right or to the left to keep the implement straight with the line of work, especially when work is to be performed upon a hillside.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the improved machine. Fig. 2 is a detail perspective view of a portion of one of the frames, illustrating the manner in which the shovel-shanks are attached to a frame. Fig. 3 is a view of different-shaped shovels used in connection with the standards shown in Figs. 1 and 2. Fig. 4 is a rear elevation of a portion of the connection between the rear frames of the machine and one of the caster-wheels, the cap for the shank of the wheel being in section. Fig. 5 is a plan view of the device when employed for weeding purposes. Fig. 6 is a plan view of a single form of the device in which pulverizing-shovels are shown, and Fig. 7 is also a plan view of a single form of the machine in which the shovels are adapted for weeding.

The machine may consist of a single shovel-carrying frame A, as shown in Figs. 6 and 7, or of a series of pivotally-connected frames, as shown in Figs. 1 and 5, the frames when so arranged approximating the shape of a triangle. In the double form of the machine, or that shown in Figs. 1 and 5, a front frame A' is employed and two rear frames B and C. Each of these rear frames consists of diverging side bars 10 and 11, the said side bars being wider apart at the rear than at the front, and an intermediate longitudinal bar 12, which intermediate longitudinal bar in the rear frame is parallel with the right-hand side beam 11. The side beams and intermediate beams of the frames are adapted to carry shanks 13, to which shovels 14 are secured. As illustrated in Fig. 2, these shanks are preferably angular in cross-section and are pivotally connected with the beams by means of bolts 15 or their equivalents, and washers 16 intervene between the said shanks and beams in order that the shanks may not unduly wear the beams. Each shank is held in position by means of a link 17. These links are pivotally attached to the shanks at their rear portions about midway between their ends, and said links are passed through keepers 18, secured to the beams, the links where they pass through the keepers having a series of apertures 19 made therein, and a break-pin 20 is passed through the keeper for each link and an aperture in the link, as shown in Fig. 2, so that in the event the shovel should meet with any obstruction which it cannot pass or dislodge the pin 20 will break and the shank and shovel will be free to move rearward and so clear the obstruction. The forward frame A' is provided at its front with a tongue 21, and a cross-bar 22 is attached to the forward end of the tongue, the tongue and cross-bar being adapted to support a shifting mechanism for the draft, to be hereinafter described.

The front frame or section A' is provided with an auxiliary upper frame A², and this frame consists of side bars 23, that are likewise wider apart at their rear ends than at the front, and the side bars 23 extend beyond the side beams of the main front frame or section A', as shown in Fig. 1. The side beams 23 of the superstructure A² are connected at their rear ends by a cross-bar 24 and near their forward ends by a cross-bar 25, attached to blocks 24ᵃ, and the side beams 23 of the superstructure are further connected by an intermediate cross-bar 26, that extends beyond the side beams 23 of said structure.

The rear frames or sections B and C are connected with the superstructure A² of the front frame or section A' by means of links 27, attached to said superstructure near the side portions of its rear end, as shown in Figs. 1 and 5. The rear frames or sections B and C are alike in construction to the front frame or section A', and the right-hand rear section or frame C has the intermediate beam 12 therein parallel with the side beam 10 instead of the side beam 11, so that the intermediate beams of the rear frames or sections are inclined in direction of each other, and the intermediate beam of the front frame A' extends from said frame at a point about centrally between the two rear frames or sections B and C, as is shown in Figs. 1 and 5. Each of the rear frames or sections is provided with a cross-bar 28 between its ends and with a short diagonal bar 30, that extends from the side beams 11 in direction of the intermediate beam, and this diagonal beam 30 and also the intermediate and side beams are provided with shanks adapted to carry shovels of the construction heretofore stated. The rear sections or frames are connected by links 31, that are attached to rear cross-bars 29, secured upon said rear frames or sections, and a vertical spindle 32 is held to slide vertically in an eye or sleeve 33, attached to one of the links 31, the said spindle 32 being provided with a wheel 34 at its lower end, adapted to rest upon the ground. A cap 35 is placed upon the upper end of the spindle 32, and this cap is attached to one end of a chain 36, which is passed in engagement with a roller 38, located on one of the connecting-bars 29, as shown in Fig. 4, and the free end of the chain 36 is attached to a keeper 37, so that the frame may be raised and lowered by lengthening or shortening the chain 36.

Each rear frame or section B and C is provided with a similar regulating device at the outer end of its rear cross-bars 29, and said adjusting or regulating attachment consists of vertical spindles 32ᵃ, provided with wheels 34ᵃ at their lower ends, and caps 35ᵃ, to which one end of chains 36ᵃ is attached and passed over rollers 38ᵃ to an engagement with keepers 37ᵃ. Similar adjusting or regulating devices are provided for the front frame or section A', and these forward adjusting or regulating devices consist of spindles 40, mounted to slide in suitable guides attached to the ends of the intermediate cross-bar 26 of the superstructure A², each spindle being provided at its lower end with a wheel 41 and at its upper end with a cap 42, and each cap 42 is attached to one end of a chain 43, and said chains are passed under rollers 44 to an engagement with keepers 45. A single adjusting device is located near the forward end of the tongue 21, comprising a vertically-adjustable spindle 50, having a wheel 51 at its lower end, a cap 52 at its upper end, and a chain 53 attached to said cap and passed under a roller 54 to an engagement with a keeper 55, as shown in Fig. 1.

A platform 56 is provided for the driver, and this platform is pivotally connected by a pin 57 at its forward end to the cross-bar 25 of the superstructure A², and the rear end of the platform is provided with a cross-bar 58, extending beyond its sides. At each end of said cross-bar 58 a standard 59 is erected, and these standards are pivotally connected with davits or crank-arms 60, that are removably secured in sleeves or sockets 61, attached to the rear frames or sections B and C of the machine, as is also shown in Fig. 1. The platform 56 is provided with a driver's seat 62. A spindle 63 is vertically journaled in the forward end of the front frame or section A', said spindle 63 having a large peripherally-grooved pulley 64 secured to its upper end and a small pulley 65 attached to its lower end.

As heretofore stated, a draft-shifting mechanism is located at the front portion of the machine. This draft-shifting mechanism consists of an endless belt 67, preferably a chain belt, that is passed over the pulley 65 on the shaft 63 and over pulleys 66, that are journaled at the outer ends of the front cross-bar 22 of the machine. This belt 67 is provided with an eye or a large link 68 at its forward stretch, to which the team is to be attached in any suitable or approved manner. The link or eye 68 is shifted to the right or to the left, and therefore the direction of draft is changed by moving the large upper pulley 64, and this is accomplished readily by the driver or may be accomplished by moving the chain belt 67 directly by hand. When, however, the direction of draft is to be changed from the platform 56, a windlass 69 is mounted in suitable bearings on said platform, and said windlass is operated through the medium of a shaft 70, having a crank-arm adjacent to the driver's seat, as shown in Fig. 1. The end of a rope or chain 71 is attached to the windlass and wound thereon, and said rope or chain is carried in direction of each side of the platform under guide-pulleys 69ᵃ and is wound around the large shifting-pulley 64, as is also best shown in Fig. 1. Thus it will be observed that the shovels, which may be of any character, may be made to enter the ground to a greater or a less extent by the vertical adjustment of the various spindles carrying the caster-wheels described, and the direction of draft may be quickly changed at the option of the driver.

In Fig. 1 the shovels 14 are those particularly adapted for cultivating purposes, whereas under the construction of the machine shown in Fig. 5 the shovels 73 are especially adapted for weeding purposes, and in either case the shanks 13 for the shovels are so placed that the shovels will be located in oblique series of rows, and under the construction of the device shown in Fig. 5, in which the platform is omitted and the windlass, each rear section or frame B and C is provided with a short diagonal bar 72 at its front portion, the bars 72 of the two frames or sections inclining in opposite directions, and the sleeves 74, adapted to receive the crankarms, davits, or hangers 60, are attached to auxiliary longitudinal beams 75.

In Fig. 6 I have illustrated a single frame with the above-described draft-shifting mechanism applied, and this single frame consists of a front cross-bar 76, an intermediate bar 77, a rear cross-bar 78, and diverging side bars 79, to which the standards 13 are attached and to which pulverizing-shovels 80 are secured, together with intermediate longitudinal beams 81, adapted likewise to carry shanks or standards 13, the beams 81 being parallel with each other and substantially parallel with the right-hand side beam of the frame. At the ends of the rear cross-bar 78 vertically-adjustable spindles 82 are located, carrying rollers 83 at their lower ends and caps at their upper ends, the caps being attached to chains 84, that pass under rollers 85, the inner ends of the chains being adapted for engagement with keepers 86.

In Fig. 7 I have illustrated a single frame adapted for weeding purposes. The only difference between the machine shown in Fig. 7 and that shown in Fig. 6 is in the character of the shovels 88, which are adapted for weeding purposes and are of the same character as the shovels shown in the double form of the machine shown in Fig. 5.

Having thus described my invention, I claim as new and desire to secure by Letters Patent—

1. In a cultivator and harrow provided with shovel-carrying beams, caster-wheels arranged to support the machine at the front and the rear thereof, vertical spindles carrying said wheels at their lower ends, the said spindles being mounted loosely in guides carried by the frame of the machine, chains or cables connected to the upper ends of the spindles, guide-pulleys for the chains or cables and fixed keepers for the free ends of the chains or cables, substantially as described.

2. In a cultivator and harrow provided with shovel-carrying beams, a supporting-wheel for the forward end of the machine, a cross-bar at the rear of the machine and projecting from the sides thereof vertical spindles mounted in the ends of the cross-bar and each carrying a wheel at its lower end, a cap on the upper end of each spindle, chains or cables connected at one end to said caps, guides on the cross-bar for the chains or cables and fixed keepers on the cross-bar for the free ends of said chains or cables, substantially as described.

3. In a cultivator and harrow, longitudinal shovel-carrying beams, cross-bars connecting the shovel-carrying beams, a tongue at the forward end of the machine, a draft-regulating device, a spindle adjustable in the forward end of the tongue, and carrying a wheel at its lower end, a chain or cable connected to the upper end of said spindle, a pulley on the tongue and under which the said chain or cable passes, a keeper on said tongue for the end of the chain or cable, spindles adjustable in the ends of the rear cross-bar of the machine, and carrying wheels at their lower ends, chains or cables connected with the upper ends of said spindles, and pulleys and keepers on said cross-bar for the cables or chains, substantially as described.

4. In a harrow and cultivator, the combination with a front frame and rear frames having a link connection with each other, of a platform carried by said frames, a pivot connecting the front of the platform with the forward frame, sockets on the rear frames of the machine, and hangers connected with the rear end of the platform, and removably secured in said sockets substantially as described.

5. In a harrow and cultivator, the combination, with a forward frame and rear frames having link connections with each other and arranged in triangular order, of an extension from the front of the forward frame, a draft-regulating device carried by said extension, spindles adjustably located in the said frames and in their connections, each spindle being provided with a wheel at its lower end, chains or cables attached to the upper ends of said spindles, pulleys on the frames and under which the said cables or chains pass, and keepers for the free ends of the said chains or cables, as and for the purpose specified.

6. In a harrow and cultivator, the combination with the forward and rear angular frames, adapted to carry shovel-standards, the said frames having their base portions facing rearward, link connections between the rear frames and forward frame and a link connection between the rear frames, a platform carried by said frames, a pivot connecting the front of the platform with the forward frame, and hangers having swinging connection with the rear end of the platform, of adjustable supports for the frames and their connections, a draft-regulating device located at the forward portion of the forward frame, and a shifting mechanism for the said draft-regulating device, capable of operation at the said platform, for the purpose described.

7. In a cultivator and harrow, a front frame and rear frames, the rear frames having a link connection with each other, and each rear frame having a link connection with the front frame and adjustable wheeled supports for the said frames and their connections, the link connecting the rear frames with each other being provided with a sleeve in which one of said wheeled supports is held to slide vertically, substantially as described.

MICHAEL SMITH.

Witnesses:
J. W. KING,
L. K. BROWN.